United States Patent

[11] 3,614,410

| [72] | Inventors | Knight V. Bailey<br>Ferndale;<br>Dudley P. Hattaway, Madison Heights, both of Mich. |
|---|---|---|
| [21] | Appl. No. | 832,808 |
| [22] | Filed | June 12, 1969 |
| [45] | Patented | Oct. 19, 1971 |
| [73] | Assignee | The United States of America as represented by the Secretary of the Navy |

[54] IMAGE RECTIFIER
19 Claims, 11 Drawing Figs.

[52] U.S. Cl............................................. 235/186,
33/1 A, 33/18 C, 95/12.5, 318/637, 346/29,
346/31, 235/151.11
[51] Int. Cl...................................................... G06g 7/22
[50] Field of Search.......................................... 346/29, 31;
318/637; 235/186, 189; 95/12.5; 33/1 A, 18 C, 25 D

[56] References Cited
UNITED STATES PATENTS
2,839,974   6/1958   Reiner et al. ................. 95/12.5
3,153,224  10/1964   Taylor.......................... 33/18 C UX
3,422,537   1/1969   Dewey et al. .................. 33/18 C OTHER REFERENCES
Standard Mathematical Tables (Student edition) 14 th ed. Cleveland, Ohio, The Chemical Rubber Co., 1965, pp. 497 and 515.

Primary Examiner—Eugene G. Botz
Assistant Examiner—R. Stephen Dildine, Jr.
Attorneys—Edgar J. Brower, T. O. Watson, Jr. and T. J. Madden ABSTRACT: This invention is directed to an apparatus that plots an orthogonal projection of a photograph or similar image which was taken at an angle to the earth's surface. A stylus is used to outline the image which is to be rectified. The $x$ and $y$ cartesian coordinates of the stylus position are fed to an analog computer together with data relating to the camera's position at the time the image was taken. The computer, utilizing trigonometric relationships, calculates rectified equivalents of the $X$, $y$ coordinates. These equivalents are utilized to motivate a plotter which traces a rectified drawing of the input image.

INVENTORS
KNIGHT V. BAILEY
DUDLEY P. HATTAWAY

BY Thomas O. Watson Jr.
Thomas J. Madden
ATTORNEYS

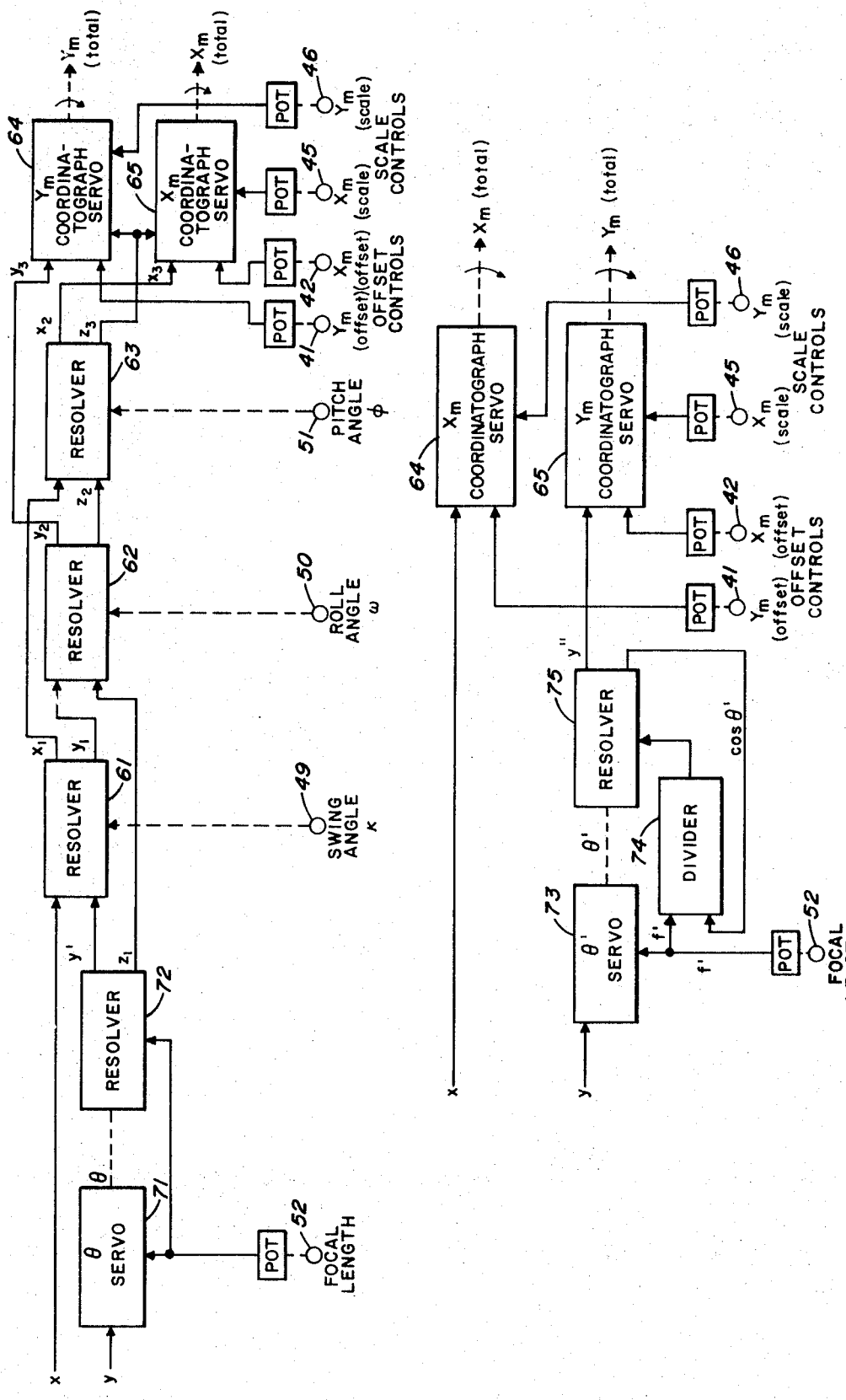

3,614,410

IMAGE RECTIFIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention is directed to plane rectification. More particularly, it is directed to the making of rectified line drawings from all types of aerial imagery.

2. Description of the Prior Art

Exploitation of reconnaissance photography almost invariably involves plane rectification. Various methods of accomplishing this are available. These methods, however, are limited with respect to the range of format, focal length, and tilt combination that can be accommodated. Analytical methods utilizing interpretation tables have been developed but these methods require interpolation, search and utilize discrete values. In addition, these systems are extremely combersome and are so complex as to be impractical for use with all types of aerial imagery.

SUMMARY OF THE INVENTION

The present invention is directed to a rectification system which provides a rigorous and simple general solution to plane rectification. The system plots continuous values and requires no interpolation or search. The inventive rectifier is operative with all types of aerial imagery. It rectifies planar oblique, panoramic, side-looking radar, and electronic infrared images. The inventive system is portable and may be set on top of an office desk. It is made from lightweight materials and weighs less than 150 pounds including the carrying cases.

The inventive device can rectify images taken by cameras whose roll and pitch angles may be as great as 80° and whose swing angle can vary between 0° and 180°. The camera focal length can vary between 3 and 36 inches.

The line drawing rectification system consists of three major units: input module, rectifying computer, and output module (coordinatograph). The imput module consists of a mounting board for holding photographs and other records and a manually positionable noncontacting stylus for tracing the input images. Sufficient ranges of variables are provided to allow any $x$ or $y$ displacement within the required working surface. Angular transducers are positioned by the stylus and produce output signals which are a direct $x$ and $y$ measurement of the stylus position. The rectifying assembly consists basically of analog-type computing circuits and controls which perform transformations, computations, and corrections as required to provide rectification of input records. The output consists of an $x$, $y$ plotter which is controlled in the $x$ and $y$ directions by the output of the computer to produce rectified line drawings of the input image.

It is an object of the present invention to provide a new and improved plane rectification system.

It is a further object of the present invention to provide plane rectification system which is capable of rectifying all types of aerial imagery.

It is a still further object of the present invention to provide a plane rectification system which is lightweight, portable, and provides a simple rigorous solution to the problem of plane rectification.

Other objects, advantages and novel features of the present invention will become apparent from the following detailed description of the invention when considered in conjunction with the accompanying drawings.

BRIEF DESCRIPTION OF THE DRAWINGS

FIG. 9 is the circuit diagram for the computer in the panoramic mode of operation;

FIG. 11 is the circuit diagram for the computer in the infrared mode of operation.

DESCRIPTION OF THE PREFERRED EMBODIMENTS

Figure 1:
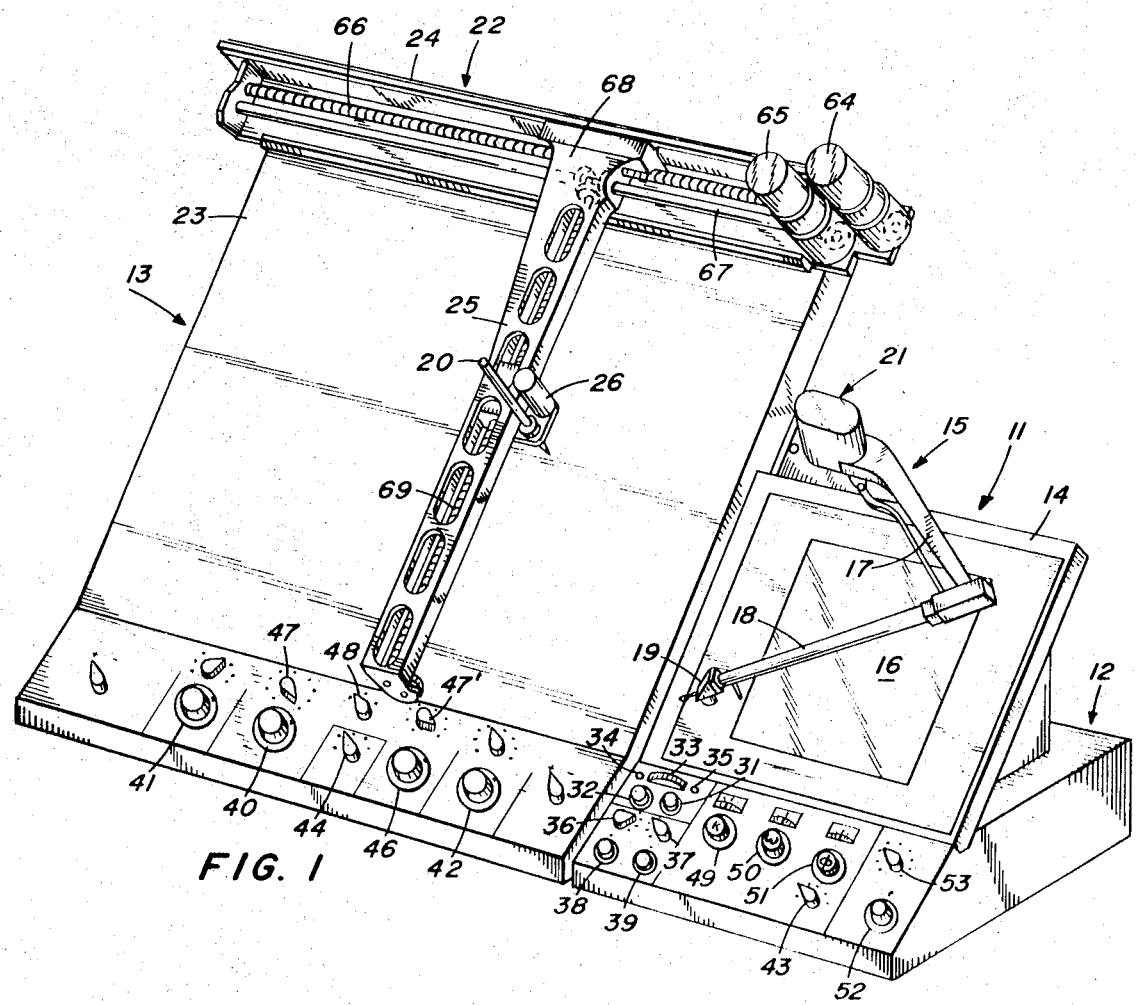
FIG. 1 shows the inventive rectifier.
Figure 2:
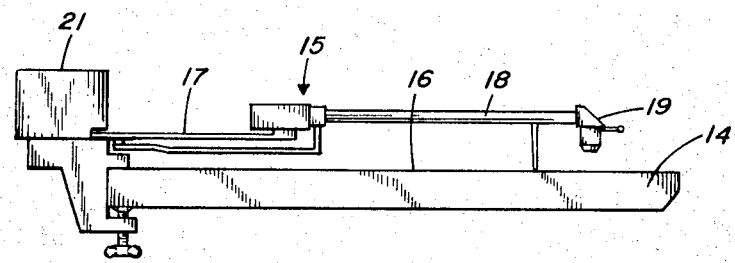
FIG. 2 shows a side view of the input module.

Referring more particularly to the drawings, FIG. 1 shows the input module 11, the rectifying computer 12, and the output module 13. The input module essentially comprises a light table 14 and an input stylus assembly 15. A photograph 16 or similar image from which a rectified line drawing is to be made is shown mounted on the light table 14.

The stylus assembly 15 consists of two movable arms 17 and 18. A projection assembly 19 is mounted in arm 18 and projects crosshairs onto the light table 14. An adjustable iris is provided in the projection assembly 19 for varying the intensity of the projected crosshairs. Illumination is provided by a light mounted inside arm 18. The position of the light table may be either horizontal or at the angle shown in FIG. 1. Two AC resolvers are mounted on the stylus assembly at 21. One resolver is connected to each arm 17 and 18 and will have an angular position corresponding to the angle of the arm it is connected to. Controls, not shown, are provided for varying the lumen intensity of the light table 14 and for turning off selected areas of the light provided by the light table.

The output module 13 includes an $x$–$y$ plotter 22 and a vacuum table 23. The stylus assembly and the $x$–$y$ plotter may both be removed from their respective tables and placed on any flat surface. The entire plotter is small enough to permit operation from an office desk and can be packed in two small carrying cases.

The $x$–$y$ plotter has two arms 24 and 25. Arm 24 is operable to drive arm 25 in the $x$ direction and arm 25 is in turn operable to drive pen 26 in the $y$ direction.

Plotting paper upon which the rectified line drawing is made is mounted on the vacuum table and receives impressions from the pen 20. A separate control, not shown, is provided for raising and lowering the pen.

The rectifying computer 12 receives its inputs from the resolvers connected to arms 17 and 18 and provides the output drive for arms 24 and 25 of $x$–$y$ plotter 22. The computer rectifies the images obtained by aerial imagery. The circuitry involved is shown in FIGS. 7, 9, 10, and 11.

Figure 3:
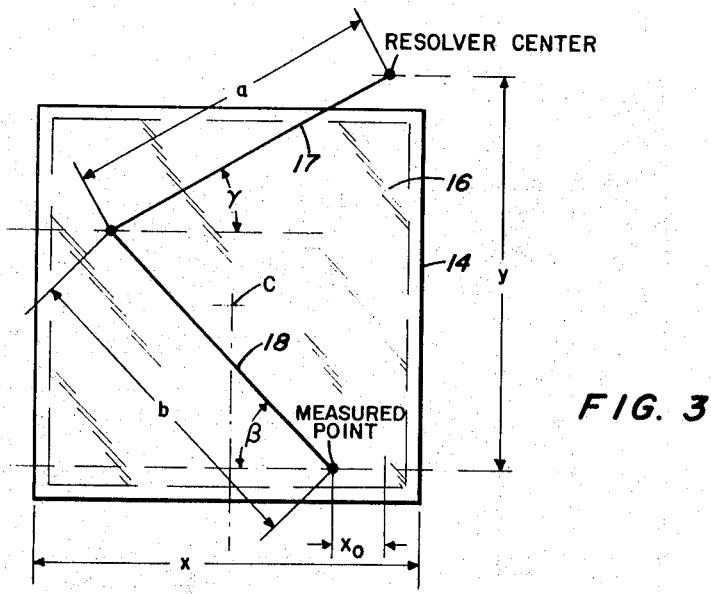
FIG. 3 shows the goemetry utilized with the stylus apparatus.

Turning now to the operation of the invention, the geometry of the stylus apparatus should first be considered and this is shown in FIG. 3. The resolver enter is the principal point of the entire assembly and occurs normally at the center of the light table 14. The $x$ and $y$ coordinates of the position of the measured point are found from the trigonometric equation:

(1) $x = a \cos \gamma - b \cos \beta$ (2) $y = a \sin \gamma + b \sin \beta$ where $x$ and $y$ = the rectangular coordinates of the stylus position as measured from the center of the resolver package $a$ and $b$ = lengths of arms 17 and 18 respectively $\gamma$ and $\beta$ = the angles of the arms; i.e., these angles represent the acute angles of the arms with respect to an $x$ axis.

The zero position ($x=0$, $y=0$) of the X, Y rectangular coordinate system occurs at the center of the light table. A fixed bias is added to the $x$ and $y$ coordinates defined by equations (1) and (2) to obtain this result. Dials 31 and 32 are connected to potentiometers in the computer. These potentiometers together with null meter 33 and on-off switches 34 and 35 are operable to adjust for small displacement (±1 inch) of the centerpoint C from the center of the input table.

Figure 5:
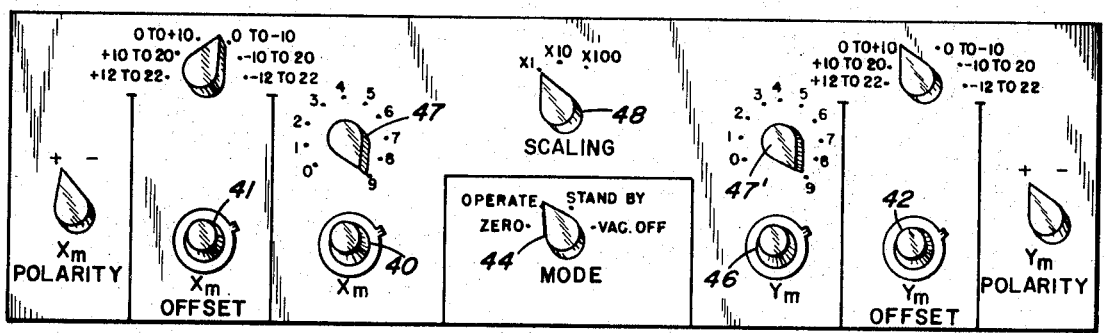
FIG. 5 shows the controls for the output mode.

A stylus offset control is also provided to allow centerpoint to be positioned at other locations. Rotary switches 36 and 37 provide an offset range of ±20 inches in increments of 10 inches. Potentiometers controlled by switches 38 and 39 work within the increment selected by the switches 36 and 37 and are variable over the 10-inch increment. A similar offset arrangement (Dials 41 and 42, shown in FIG. 5) is provided for the rectified output drawing in the output mode. The stylus offset is useful when only a selected portion of an aerial image is to be rectified.

The resolvers positioned by the arms provide the sine and cosine of the angles $\gamma$ and $\beta$ and these are multiplied and summed in the computer in accordance with equations (1) and (2) to obtain the stylus positions $x$ and $y$ at the measured point.

Figure 4:
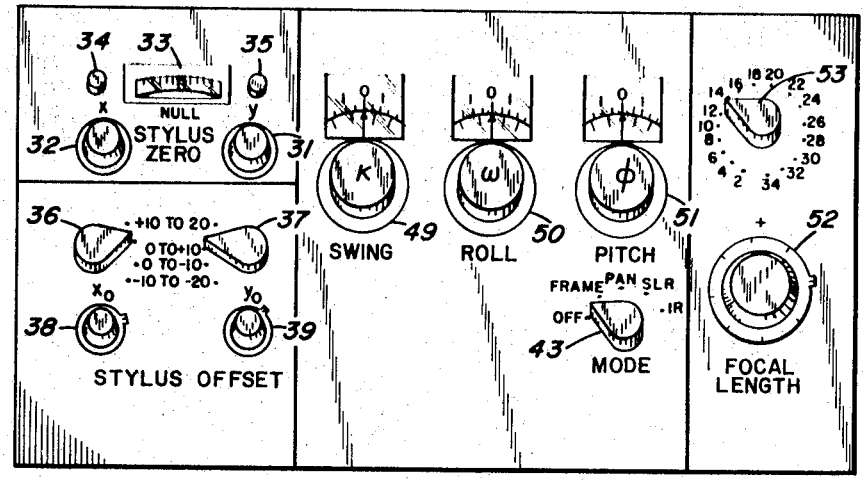
FIG. 4 illustrates the controls used for the rectifying computer.

The inventive device has four modes of operation. It rectifies planar oblique photographs (frame mode); it rectifies panoramic photographs (pan mode); it rectifies rectilinearized side-looking radar records (SLR mode); and it rectifies infrared sensor line-scan records (IR mode). The computer is activated for the desired mode of operation by switch 43 (FIG. 4) on the computer control panel.

PLANAR OBLIQUE PHOTOGRAPHS

Figure 6:
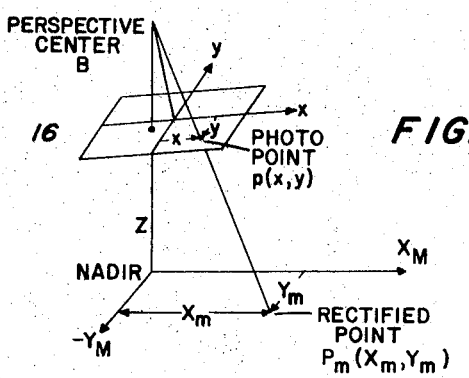
FIG. 6 details the geometry utilized in the planar oblique mode of operation.

The geometry involved in this mode is seen in FIG. 6. In the Figure, a photograph 16 taken from an aircraft is shown at an angle to the ground. The angle of the photograph is the angle of aircraft at the time the picture was taken. Point $P_m$ is a point in the rectified plane which will appear on the tracing paper mounted in the vacuum table 23 in the output module. Point $p$ $(x, y)$ is a point in the tilted aerial photograph corresponding to the rectified point $P_m$ and is defined by the $x$ and $y$ coordinates as measured by the input stylus and computer. Uppercase letters refer to the rectified image and lowercase letters refer to the photograph.

The computer's problem is to supply the rectified coordinates $X_m$ and $Y_m$ from the input coordinates $x$ and $y$. Geometrically, it involves projecting the photograph coordinates on model coordinates. To accomplish this the computer solves the equations which follow. The swing, pitch, and roll angles are those recorded at the time the photograph was originally taken.

The photocoordinates are first rotated through the swing angle ($K$) of the airplane about the optical axis of the photograph, thus (3) $x_1 = x \cos K - y \sin K$
(4) $y_1 = x \sin K + y \cos K$
(5) $z_1 = -F$
where
$F$ = focal length of the tilted photograph.

The photograph components are then rotated through the roll angle ($\omega$) about the $x_1$ axis of the photograph. Thus, (6) $X_2 = x_1$
(7) $Y = y_1 \cos \omega - z_1 \sin \omega$
(8) $z_2 = y_1 \sin \omega + z_1 \cos \omega$ Finally, the coordinates are rotated through the pitch angle $\Phi$ about the $y_2$ axis and the equations are (9) $x_3 = x_2 \cos \Phi - z_2 \sin \Phi$
(10) $Y_3 = y_2$
(11) $z_3 = x_2 \sin \Phi + z_2 \cos \Phi$ The $x_3$ and $y_3$ coordinates are associated with the $X$–$y$ plotter and are the rectified coordinates of the point $p$ in the photograph. The coordinates are not scaled properly, however. The actual scaled output is obtained from the equations

(12) $$X_m = \frac{(f)(c)}{z_3} x_3$$

(13) $$Y_m = \frac{(f)(c)}{z_3} y_3$$

where $Y_m$ and $X_m$ are the rectified coordinates as plotted by the $X$–$y$ plotter,
$(f)(c)$ is the scale factor,
$f$ is the focal length of the camera, and
$c$ is the desired magnification.

Figure 7:
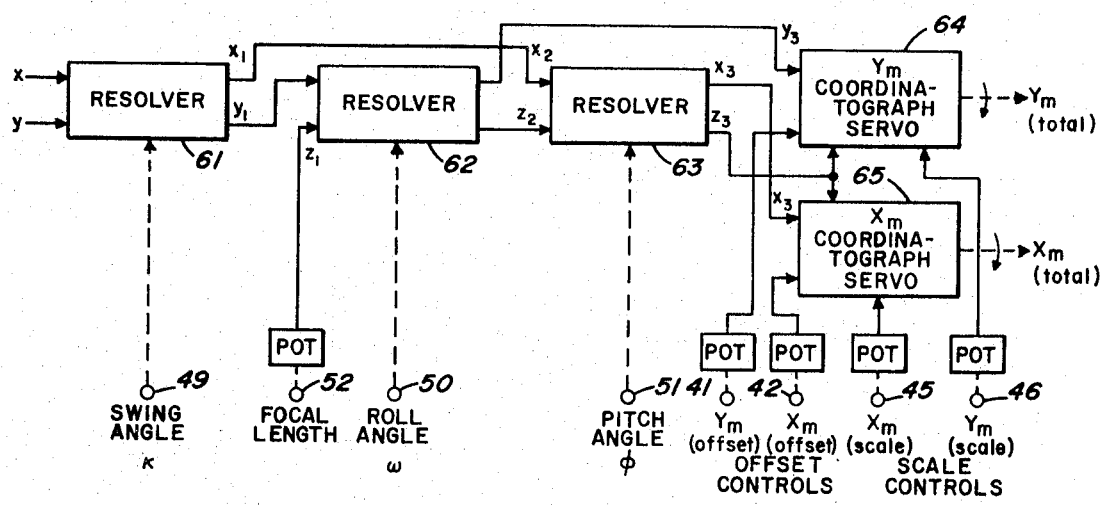
FIG. 7 is the circuit diagram for the computer in the planar oblique mode.

Now turning to FIG. 7 and the operation in this mode, the input mode switch 43 is set to frame and the output mode switch 44 is set at the operate mode. The stylus apparatus position is then nulled and any desired offset in the input or output modules is selected.

At this point using dials 49, 50, and 51 and observing the meters associated with each, the operator enters the swing, roll, and pitch angles of the plane, these in turn set the angular position of resolver packages 61, 62, and 63 (FIG. 7) in the computer.

The desired $X_m$ and $Y_m$ polarity is selected and the scale factor is entered for each axis by switches 45 and 46 which adjust potentiometers between 0 and 0.99 volts, these are added to the voltages set by switch 47 and 47' and the sum is multiplied through switch 48 and its associated circuitry, not shown.

The operator then positions the crosshairs of the stylus apparatus over point $p$ in the photograph. The resolver package at 21 then solves equations (1) and (2) and feeds the computed values of $x$ and $y$ to a second resolver package 61 where the values of $x$ and $y$ are multiplied by the sine and cosine of $K$ and added in accordance with equations (3) and (4).

The value of $y$ at the output of resolver 61 is passed to resolver package 62. Similarly, $z_1$, which is the focal length, is entered by switches 52 and 53. Resolver package 62 multiplies $y_1$ and $z_1$ by the sine and cosine of $\omega$ and adds these values in accordance with equations (7) and (8).

The output $x_1$ of resolver 61 together with the output $z_2$ of resolver 62 are connected to resolver package 63. These values are multiplied by the sine and cosine of $\Phi$ and added in accordance with equations (9) and (10).

The value of $y_3$ obtained at the output of resolver package 62 is fed to the $Y_m$ coordinatograph servo 64 together with the output $z_3$ of resolver 63 and the scale factor setting. These values are multiplied and divided in accordance with equation (12) to obtain the value $Y_m$.

Coordinatograph 65 similarly receives the output $x_3$ of resolver package 63, the output $z_3$ and the scale factor and solves equation (12) to obtain the value of $X_m$.

Servo 64 then drives ball screw 66 to move pen 26 in the $x$ direction. Servo 65 drives a spline 67 which by use of miter gears 68 drives a ball screw 69 to position pen 26 in the $y$ direction. Pen 24 is then lowered and scribes rectified point $P_m$, FIG. 6, on the plotting paper. The operation is then repeated for each point in the photograph. While described here for convenience as a point-by-point operation, the operation is in fact continuous and once the pen is lowered it is not ordinarily raised until rectification is complete.

When charts are available, the operation of the inventive rectifier can be initiated by reiterative trial and error techniques similar to those used in the orientation of stereo models in a stereo plotting instrument. The exact values of the pitch, roll, and swing angles are not needed. In this mode, the photograph is set on the light table 14 and a chart of the area photographed is oriented on the vacuum table. Four control points, defining the largest possible quadrilateral area, are selected on the photograph and are marked and identified on the chart. The swing, roll, and pitch angles are then set to their approximate values as well as they are known.

This method is designated as the empirical method in contrast to the previous method which is analytical. In operation, the stylus apparatus is moved until the crosshairs at 19 are over a first and a second adjacent control point. The output $(X_m, Y_m)$ scale, the output $(X_m, Y_m)$ offset, and the swing angle $K$ are adjusted until the control points coincide on both the chart and the aerial image. Coincidence will occur when the stylus apparatus and the $x$-$y$ plotting pen 26 are positioned at coinciding points. The pitch $\Phi$ and roll $\omega$ inputs are then adjusted to achieve approximate coincidence of the remaining two points and their positions on the chart. These two adjustment steps are repeated until the best possible coincidence between the four control points and their charted positions is obtained. This procedure establishes the rectified position of four points and therefore results in the proper setting of the computer inputs for accurate rectification. The procedure outlined is equally applicable to the panoramic mode.

PANORAMIC MODE

Figure 8:
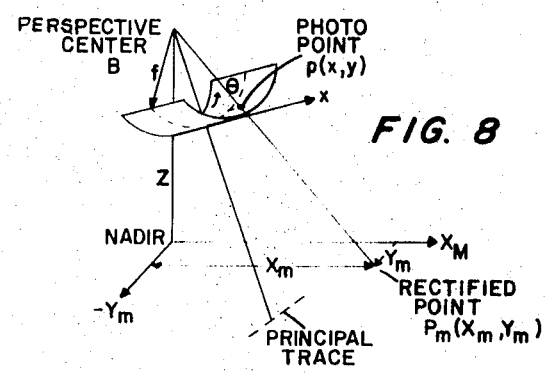
FIG. 8 details the geometry utilized in the panoramic mode of operation.

In this mode, a panoramic photograph is rectified. The geometry involved in rectifying an aerial photograph 16 which is taken through a sweep angle $\theta$ is shown in FIG. 8. The picture is both tilted and curved in relation to the flat rectified surface. The arc of curvature is defined by the focal length of the camera. The point $p(x, y)$ is a point in the photograph and the point $P_m(X_m, Y_m)$ is the same point in the rectified output.

The computer is the same as in the planar oblique mode and the equations solved by the computer with the exception of the $y'$ and $z_1$ terms are identical to those solved in that mode. The $y'$ and $z_1$ terms are defined as follows:

(14) $y' = f \sin \theta$
(15) $z_1 = f \cos \theta$ where $y'$ and $z_1$ are defined as inputs to the coordinate rectification chain. Specifically, $y'$ is an input to resolver package 62 and $z_1$ is an input to resolver 63,
$f$ = focal length, and
$\theta$ = sweep angle of the panoramic photograph.

The sweep angle $\theta$ is in turn computed from the input record by the folowing relationship:

(16) $\theta = y/f$ where $y$ = the $y$ coordinate of point $p$ in the photograph.

To operate in this mode the input mode switch 43 is set to PAN and, referring to FIG. 9, this operation switches the focal length input to the input of a computing servo 71 and a resolver package 72. The computing servo also receives the $y$ output of the stylus apparatus and divides the two inputs in accordance with equation (16). The output $\theta$ of servo 71 then sets the angular position of resolver package 72. The resolver package is operative to take the sine and cosine of $\theta$ and multiply them in accordance with equations (14) and (15). The output $y'$ and $z_1$ are then fed to resolver package 62 and 63 respectively. The analytical and empirical operation of the invention in this mode is in all other respects identical to the operation in the planar oblique mode.

SIDE-LOOKING RADAR MODE

In this mode the radar itself provides internal correction for the sweep, roll, and pitch of the aircraft and so there is only a scale factor change between the input picture from the radar and the rectified output. Switch 43 is turned to the SLR mode and the output of the stylus apparatus is connected directly to the $x$-$y$ plotter. The equations solved are:

(17) $X_m = (SF)x$
(18) $Y_m = (SF)y$ where $SF$ is the scale factor and is computed by the operator from the equation $SF$ = (Range) × (Desired output scale) × 10,000 and $X_m$ and $Y_m$ are the coordinates of a point $P_m$ in the rectified output, and $x$ and $y$ are the coordinates of a point $p$ in the radar image input.

Figure 10:
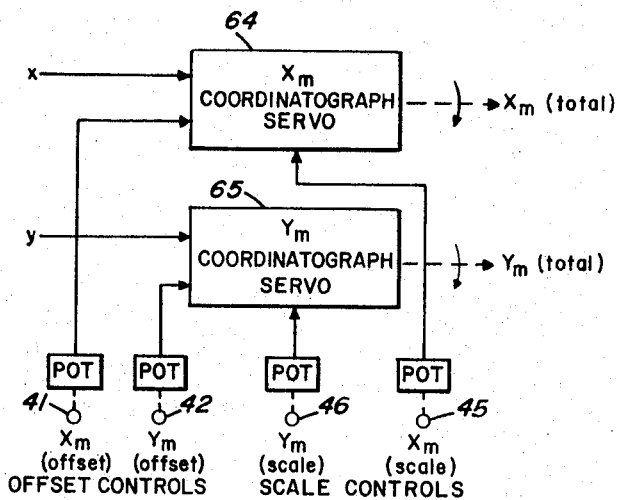
FIG. 10 shows the circuit diagram for the computer in the side-looking radar mode.

In operation the desired polarity and offsets are selected, the stylus nulled, and a point-by-point continuous rectification is performed as in the previous modes. As seen in FIG. 10, the stylus apparatus is connected directly to the $X_m$ and $Y_m$ servo packages 64 and 65. The scale factor $SF$ is entered through $X_m$ and $Y_m$ scale control switches 45 and 46 together with the $x$ and $y$ position coordinates of the stylus apparatus.

The emperical operation for this mode is quite simple since it only involves adjusting the output scale. As in the other modes, a chart of the area photographed is necessary. Four control points on the photograph and their position on the chart are identified. The output scale is then adjusted until the four points on the photograph and their corresponding positions on the chart are in the closest possible coincidence. At this point, as before, the operator may proceed to rectify the photographic image. This same method is used in the infrared mode with the $x$ and $y$ position coordinates of the stylus apparatus.

INFRARED MODE

In the infrared mode, the sweep, pitch, and roll of the aircraft are also nulled because the system handles only vertical data. The input is a panoramic infrared image taken by infrared sensors mounted on the aircraft.

The $x$ position is determined by the position of the aircraft and therefore the rectification of this coordinate requires only a change in scale factor.

A geometric distortion is introduced for the $y$ coordinate because of the sweep angle $\theta'$ of the infrared sensor. The computer resolves the distortion by solving the following equation:

$\theta' = y/f'$
$y'' = f' \tan \theta'$ where $y$ is a coordinate of a point in the infrared input as measured by the stylus,
$y'$ is the rectified coordinate of $y$, and
$f'$ is a fixed constant similar to focal length.

In this mode, the operator selects the IR mode with switch 43, makes adjustments for offset and polarity and traces over the infrared input image to obtain a point-by-point continuous rectification of it. Referring to FIG. 11, operation of switch 52 controls the focal length input to servo 73 and divider 74. Servo 73 also receives the $y$ coordinate output from the stylus apparatus and implements equation (17). The output $\theta'$ of 73 is utilized to position resolver 75. Resolver 75 provides a first output $\cos \theta'$ which is fed back to divider 74 where it is divided by $f$ and passed to the input of resolver 75 to provide a second output $f' \tan \theta'$ in accordance with equation (18).

The output of the resolver together with the $x$ coordinate output of the stylus apparatus and the scale factor are fed to the input of the $X_m$ and $Y_m$ coordinatographs 64 and 65. The coordinatographs implement equations (17) and (18) to obtain the rectified output

(17) $X_m = (SF)x$
(18) $Y_m = (SF)y$ where $SF$ = (flying altitude) × (desired scale),
$X_m$ and $Y_m$ are the coordinates of the point $P_m$ in the rectified output, and
$x$ and $y$ are the coordinates of the point $p$ in the input infrared image.

Although analog techniques are utilized in the rectifying computer, the functions could also be achieved by well-known digital techniques. The choice between the two is a choice between flexibility of operation with digital circuits and simplicity of design with analog circuitry.

It should also be noted that each of the resolver packages are equipped with AC resolvers, multipliers, and adders for implementing their associated equations. The sine and cosine outputs of the resolvers are connected to multipliers where they are multiplied by the inputs to the packages. The outputs of the multipliers are then fed to the adders where they are added in accordance with the associated equations to provide the resolver package outputs.

Thus, it is seen that a new and improved image rectification system has been provided. The inventive system rectifies all types of aerial imagery and plots continuous values. The system is operative in both analytical and empirical situations.

Obviously many modification and variations of the present invention are possible in the light of the above teachings.

What is claimed is:

1. A method of making a rectified line drawing from an aerial image taken at an angle to the earth comprising the steps of
aligning a photograph about an $x, y$ axis;
tracing the photograph to obtain the $x$ and $y$ coordinates of various points thereon;
compensating the $x$ and $y$ coordinates to cancel the effects of the aircraft position at the time the photograph was taken; and
tracing the compensated $x$ and $y$ coordinates upon a recording medium.

2. The method of claim 1 wherein said tracing step includes the step of computing the $x$ and $y$ coordinates from their trigonometrical equivalents.

3. The method of claim 2 where a stylus having a first and second arm is utilized in said tracing step and wherein the step of computing implements the equations
$x = a \cos \gamma - b \cos \beta$
$y = a \sin \gamma - b \sin \beta$
where $a$ and $b$ are the lengths of the first and second arm, respectively of said stylus, and $\gamma$ and $\beta$ are the acute angles of the arms with respect to the preselected $x$-axis.

4. The method of claim 1 wherein the compensating step comprises the steps of first rotating the $x$ and $y$ coordinates through the swing angle $K$ of the aircraft and secondly rotating the $x$ and $y$ coordinates through the roll angle $\omega$ of the aircraft and thirdly rotating the $x$ and $y$ coordinates through the pitch angle $\Phi$ of the aircraft.

5. The method of claim 4 wherein said step of first rotating the $x$ and $y$ coordinates through the swing angle $K$ implements the equations
$x_1 = x \cos K - y \sin K$
$y_1 = x \sin K + y \cos K$
$z_1 = -f$
where $f$ is the focal length of the photograph.

6. The method of claim 5 where the step of secondly rotating the $x$ and $y$ coordinates through the roll angle $\omega$ implements the equations
$x_2 = x_1$
$y_2 = y_1 \cos \omega - z_1 \sin \omega$
$z_2 = y_1 \sin \omega + z_1 \cos \omega$ 7. The method of claim 6 where the step of thirdly rotating the $x$ and $y$ coordinates through the pitch angle $\Phi$ implements the equations
$x_3 = x_2 \cos \Phi - z_2 \sin \Phi$
$y_3 = y_2$
$z_3 = x_2 \sin \Phi + z_2 \cos \Phi$ 8. The method of claim 7 wherein said tracing step includes the step of computing the $x$ and $y$ coordinates from their trigonometrical equivalents.

9. The method of claim 8 where a stylus having a first and second arm is utilized in said tracing step and wherein the step of computing implements the equations
$x = a \cos \gamma - b \cos \beta$
$y = a \sin \gamma + b \sin \beta$
where $a$ and $b$ are the lengths of the first and second arm, respectively of said stylus, and $\gamma$ and $\beta$ are the acute angles of the arms with respect to the preselected $x$-axis.

10. An apparatus for producing rectified line drawings from an aerial image comprising
a stylus for tracing an aerial image;
measuring means connected to said stylus for yielding an output indicative of said stylus position;
analog-computing means connected to said measuring means and operable to provide rectification compensation for the position of the aircraft at the time the aerial image was taken; and
plotting means connected to the output of said analog-computing means for tracing a rectified drawing of said aerial image.

11. An apparatus as in claim 10 wherein said measuring means utilizes angular resolvers.

12. An apparatus as in claim 11 wherein
said aerial image is aligned along an $x$ and $y$ axis;
said stylus has a first and second arm; and
said measuring means comprises a first and second resolvers connected to said first and second arms to provide a measurement of the $x$ and $y$ coordinates of the stylus position.

13. An apparatus as in claim 12 wherein said first and second resolvers implements the equations
$x = a \cos \gamma - b \cos \beta$
$y = a \sin \gamma + b \sin \beta$
where $a$ and $b$ are the lengths of the first and second arms and $\gamma$ and $\beta$ are the acute angles of the arms with respect to the preselected $x$-axis.

14. An apparatus as in claim 12 wherein said analog computer utilizes a first computing resolver for compensating for the swing angle $K$ of an aircraft, a second computing resolver for compensating for the roll angle $\omega$ of an aircraft and a third resolver for compensating for the pitch angle $\Phi$ of an aircraft.

15. An apparatus as in claim 14 wherein said analog computer utilizes adjustable controls for setting each computing resolver according to the angle for which it compensates.

16. An apparatus as in claim 15 wherein said first computing resolver is connected to receive the $x$ and $y$ readings from said first and second resolvers and implements the following equations
$x_1 = x \cos K - y \sin K$
$y_1 = x \sin K + y \sin K$
where $x_1$ and $y_1$ are the outputs of the resolver.

17. An apparatus as in claim 16 wherein said second computing resolver is connected to receive the $y_1$ output of said first computing resolver and the focal length $f$ of the aerial image and implements the following equations:
$y_2 = y_1 \cos \omega - z_1 \sin \omega$
$z_2 = y_1 \sin \omega + z_1 \cos \omega$
where $z_1 = f$ and $y_2$ and $z_2$ are the outputs of the resolver.

18. An apparatus as in claim 17 wherein the third computing resolver is connected to receive the $x_1$ and $z_2$ outputs and implements the equations:
$x_3 = x_2 \cos \Phi - z_2 \sin \Phi$
$z_3 = x_2 \sin \Phi + z_2 \cos \Phi$
where $x_1 = x_2$ and $x_3$ and $z_3$ are outputs of said resolver.

19. An apparatus as in claim 18 wherein the plotting means includes:
a first and second servomotor means;
said first motor being connected to receive the $x_3$ and $z_3$ outputs of said computing resolvers and said second motor being connected to receive the $y_2$ and $z_3$ outputs of said computing resolvers;
a movable arm connected to said first servo for movement in the $x$ direction; and
a pen mounted on said movable arm and operable to be driven the $y$ direction by said second servomotor.